(12) United States Patent
Brown (10) Patent No.: US 7,559,721 B2
(45) Date of Patent: Jul. 14, 2009

(54) TOWING AND INSTALLATION METHOD FOR DEEPWATER PIPELINES AND RISERS

(75) Inventor: Robert J. Brown, Houston, TX (US)

(73) Assignee: Technip France, Courbevoie (FR)

( * ) Notice: Subject to any disclaimer, the term of this patent is extended or adjusted under 35 U.S.C. 154(b) by 325 days.

(21) Appl. No.: 11/380,399

(22) Filed: Apr. 26, 2006

(65) Prior Publication Data

US 2007/0253777 A1    Nov. 1, 2007

(51) Int. Cl.
  *F16L 1/12* (2006.01)
(52) U.S. Cl. .................................. 405/158; 405/173
(58) Field of Classification Search ............. 405/154.1, 405/158, 171, 173; 114/244
See application file for complete search history.

(56) References Cited

U.S. PATENT DOCUMENTS

| 3,707,077 A | 12/1972 | Garner |
| 4,789,269 A * | 12/1988 | Ayers et al. ................. 405/158 |
| 2007/0081862 A1 | 4/2007 | Wolbers et al. |

FOREIGN PATENT DOCUMENTS

| EP | 0069446 | 1/1983 |
| EP | 1 022 501 A1 | 7/2000 |
| EP | 1022501 | 7/2000 |
| GB | 2114700 | 8/1983 |
| GB | 2187256 | 9/1987 |
| GB | 2380747 | 4/2003 |
| WO | WO 03/031765 | 4/2003 |
| WO | WO 2004/033848 | 4/2004 |
| WO | WO2006/117249 | 11/2006 |

OTHER PUBLICATIONS

Partial International Search Report on corresponding PCT application (PCT/US2007/067148) from International Searching Authority (EPO) dated Aug. 16, 2007.
International Search Report on corresponding PCT application (PCT/US2007/067148) from International Searching Authority (EPO) dated Nov. 15, 2007.
Written Opinion on corresponding PCT application (PCT/US2007/067148) from International Searching Authority (EPO) dated Nov. 15, 2007.

* cited by examiner

*Primary Examiner*—John Kreck
(74) *Attorney, Agent, or Firm*—Klein, O'Neill & Singh, LLP (57) ABSTRACT

A deepwater pipeline is towed to a predetermined position by a bottom towing method with a leading end of the pipeline attached to a towing vessel and the trailing end of the pipeline attached to a trailing vessel. The trailing end is supported near the seabed using the trailing vessel, while the pipeline is dragged along the seabed. A towing speed is established, and a hang off angle for the leading end is maintained by raising and lowering the trailing end to control the length of the pipeline dragged along the seabed, and thus the amount of drag applied by the seabed to the pipeline. In a method for bottom towing and submerged flying of a riser having a leading end and a trailing end, the riser is towed by the bottom towing method at a first speed until the trailing end of the riser lifts off the seabed, whereupon the towing speed is increased.

7 Claims, 8 Drawing Sheets

TOWING AND INSTALLATION METHOD FOR DEEPWATER PIPELINES AND RISERS

CROSS-REFERENCES TO RELATED APPLICATIONS

Not applicable

FEDERALLY SPONSORED RESEARCH OR DEVELOPMENT

Not applicable

BACKGROUND OF THE INVENTION

The present invention relates to towing methods and installation methods for deepwater pipelines and steel catenary risers (SCR).

The history of pulling and towing pipelines on the seabed for the petroleum and waste water disposal industries dates back to the late 1940s. Since high power tow vessels were not available, most of the early deepwater pipeline systems were pulled using anchored barges. As higher power tow vessels were developed, the dynamic towing of pipelines became feasible, and several dynamic towing and installation methods were developed, such as, for example, the methods commonly known as the "S-lay" method and the "J-lay" method. The towing and installation of heavy, deepwater SCRs and pipelines by these conventional methods are often risky and expensive, and they are subject to water depth limitations, and they have not been feasible (for technical and/or economic reasons) for installation depths much greater than about 2500 meters.

As greater installation depths are being considered (e.g. 1800 to 2700 meters), the total submerged weight of the pipeline must drastically increase, due to, for example, the need for greater wall thicknesses for the pipe that are often necessary at extreme depths to avoid collapse and to maintain structural integrity and installation stability. There is a lack of surface equipment capable of handling such heavy pipelines using conventional towing and installation methods. Furthermore, very large offshore spreads are required to handle the installation of such massive pipelines. Thus, there still exists a need for a novel approach to deepwater pipeline towing and installation that can be used economically for very heavy deepwater pipelines.

SUMMARY OF THE INVENTION

The present invention includes a method of deepwater bottom towing of an SCR and a pipeline to an offshore floating structure, wherein the method fulfills requirements long since found lacking in the prior art. For example, the present invention permits the installation of the pipeline and the SCR at much greater depths than has heretofore been practical, with much less cost and a lower risk installation than is possible with the use of conventional methods from floating spreads.

According to one aspect, in the bottom towing method of the present invention, the SCR includes a lead end and the pipeline includes a trailing end. The SCR and the pipeline are made up onshore and launched offshore. The lead end of the SCR is towed near the water surface behind a tow vessel. For the final tow-in to the floating structure, the trailing end of the pipeline is supported near the seabed using a trailing vessel. A final towing speed is then established, and a hang-off angle (relative to vertical) at the lead end is maintained during tow-in by selectively raising and lowering the trailing end of the pipeline to vary the length of the pipeline that is dragged along the seabed. The greater the length of pipeline that is being dragged, the greater is the drag force on the pipeline, and the greater the hang-off angle relative to the vertical.

According to another aspect of the invention, the method includes steps for stopping the towing of a deepwater pipeline when it has arrived at a desired stopping position. The pipeline comprises pipeline tubing, an SCR on the pipeline leading end, temporary buoyancy devices, and a connecting clamp for fixing the SCR at the desired stopping position. A seabed anchoring device, such as a suction pile including a connecting cable, is installed on the seabed. The pipeline is towed until the connecting clamp is aligned with the pile. The connecting clamp is then mated with the connecting cable. The SCR, which includes an SCR head, is moved forward using the bottom towing method. The tow vessel is then positioned and stopped adjacent a semi-submersible platform, which includes an SCR head receiver. The tow vessel is then maneuvered (e.g., by yawing 180°) to place the SCR head into an SCR head receiver on the floating structure. The temporary buoyancy devices are then removed from the SCR.

According to a further aspect of the invention, a method is provided for bottom towing and submerged flying of an SCR. The riser includes a lead end and a trailing end. The riser is launched using a bottom towing method, in which the lead end of the riser is supported near the water surface using a leading tow vessel, and the trailing end of the riser travels on the seabed. The riser is then towed at a first velocity until the trailing end of the riser lifts off from the seabed. The towing speed is then adjusted to a second velocity.

According to another aspect of the invention, a method is provided for the return of a riser to shore, wherein the riser comprises a leading end having a tow head, a trailing end connected to a fixture on the seabed, and a permanent buoyancy system. In accordance with this method, a tow cable is connected to the tow head at the leading end of the riser, and the trailing end of the riser is disconnected from the seabed fixture. The riser is then towed at a sufficient speed to cause the trailing end of the riser to lift off the seabed. A towing configuration is established that is updated prior to touching down. The towing speed is then adjusted after touching down. An on-shore cable is deployed prior to the riser arriving on shore, and it is connected to the riser for pulling the riser on shore.

DETAILED DESCRIPTION OF THE PREFERRED EMBODIMENTS

Figure 1:
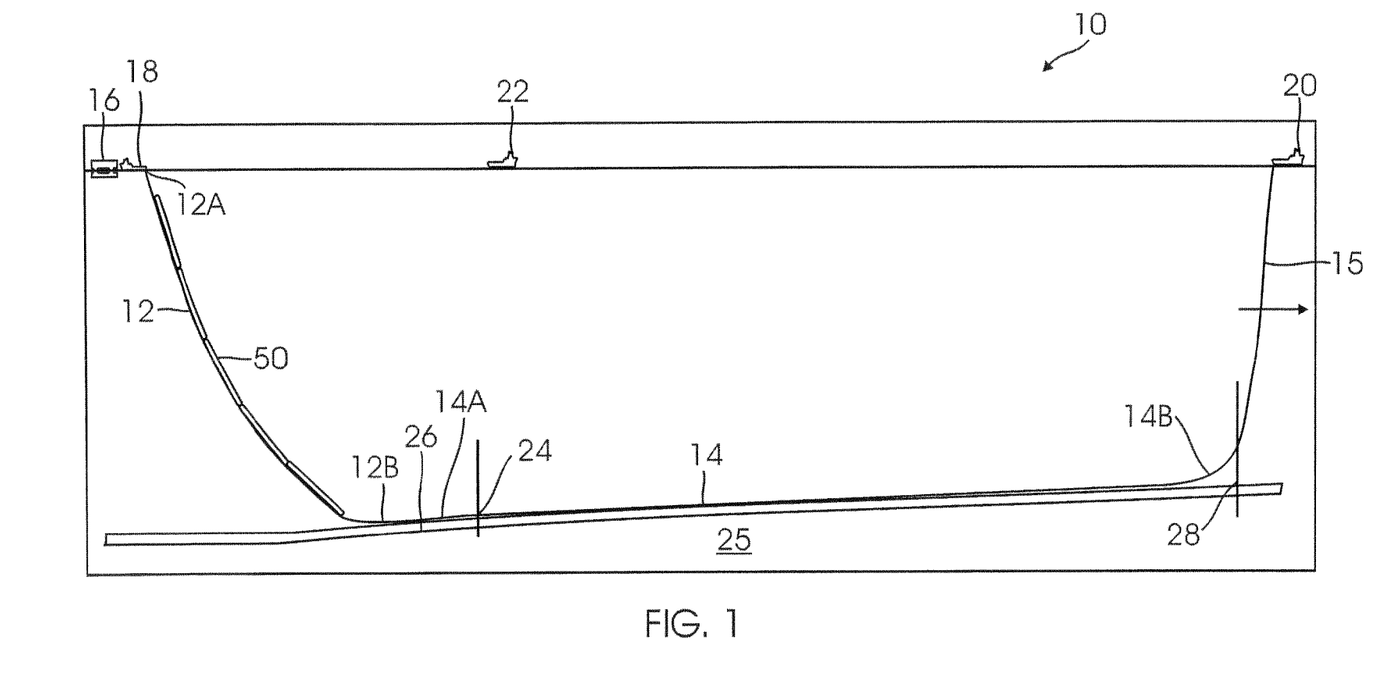
FIG. 1 is a semi-diagrammatic illustration of a deepwater bottom towing method for an SCR and a pipeline in accordance with the present invention.
Figure 2:
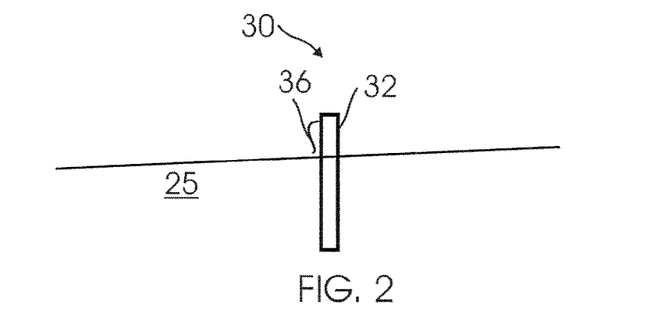
FIGS. 2-5 are simplified, semi-diagrammatic views showing the steps of securing an SCR and a pipeline to a bottom pile with a connecting cable, in accordance with the present invention.

Referring first to FIG. 1, there is shown an installation spread 10 for a method of deepwater bottom towing in accordance with the present invention. The installation spread 11 generally includes a combination of an SCR 12 and an attached pipeline 14, a semi-submersible offshore structure 16, a lead tow vessel 18, a trailing vessel 20, and an ROV handling vessel 22. The installation spread 10 may include additional support vessels (not shown) depending on the size and length of the pipeline under tow to be installed. The additional support vessels (not shown) may be used in a tandem arrangement of two or three vessels. Further, the installation spread may include a tracking survey vessel (not shown) for maintaining an acoustic observation of the pipeline track on the seabed for providing feedback to the lead tow vessel 18 for correct steerage.

The SCR 12 includes a leading end 12A and a trailing end 12B. The leading end 12A is towed close to the water surface and the trailing end 12B is towed close on or close to the seabed 25. The leading end 12A includes SCR hardware (not shown) for attaching the leading end 12A of the SCR 12 to the lead tow vessel 18 for connection to a conventional SCR receiver 54 (FIGS. 7 and 8) on the semi-submersible structure 16. The trailing end 12B of the SCR 12 is connected to, or may be a continuation of, a leading end 14A of the pipeline 14, which also includes a trailing end 14B. In one embodiment, the SCR trailing end 12B may attach to a manifold (not shown) installed on the pipeline 14. In an exemplary embodiment the length of the SCR 12 measures approximately 12,000 feet (approximately 3660 meters). The leading end 14A and the trailing end 14B of the pipeline 14 may be fitted with a number of different types of manifolds (not shown) that control, distribute or monitor the flow of a fluid in the pipeline 14. The pipeline 14 may vary in overall length, weight or diameter. In an exemplary embodiment, the pipeline 14 measures approximately 20,000 feet (approximately 6100 meters) in length.

The semi-submersible structure 16 is a floating facility in a body of water and typically is used as an offshore production facility. The semi-submersible structure 16 is typically moored or anchored to the seabed 25 by conventional means (not shown). Any number of types of floating facilities that are known in the art may be used for the semi-submersible structure 16.

The lead tow vessel 18 may be any type commonly known in the art that possesses a sufficient bollard towing capacity to tow long sections of combined SCRs 12 and associated pipelines 14. The lead tow vessel 18 may include a video display (not shown) which shows a planned route and track of the combination SCR 12 and pipeline 14. An operator of the lead tow vessel 18 monitors the displayed route (not shown) to maintain close proximity to the pipeline's planned route. In an exemplary embodiment of the invention, the lead tow vessel 18 possesses a bollard towing capacity in excess of 150 tons. The trailing vessel 20, although similar to the lead towing vessel 18, may be smaller in towing capacity.

Figure 4:
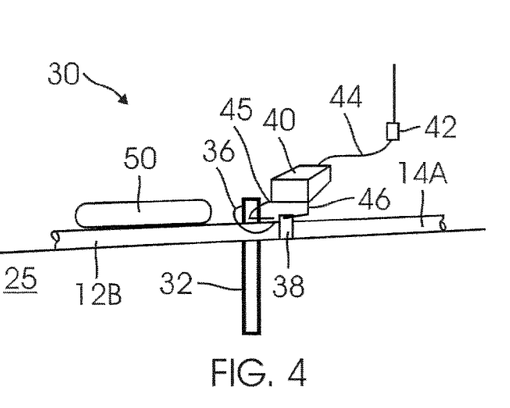

The ROV handling vessel 22 is used during an installation procedure that will be discussed in detail below. The ROV handling vessel 22 includes a communication link (not shown) to communicate with a Remote Operated Vehicle (ROV) 40 through an umbilical cable 44, as shown in FIG. 4.

FIG. 1 illustrates a method of deepwater bottom towing of the combination SCR 12 and pipeline 14. The combination SCR 12 and pipeline 14 is first launched offshore subsequent to an onshore make-up, in which the pipeline 14 and the associated SCR 12 are assembled on shore prior to being launched off shore. The most common types of make-up are perpendicular or parallel (relative to the shoreline). The perpendicular make-up requires assembling the SCR 12 and the pipeline 14, while lying perpendicular to the coastline, during the launching period, until the combined SCR 12 and pipeline 14 reaches an installation length. The parallel make-up differs by requiring that the SCR 12 and the pipeline 14 be completely assembled to the installation length while lying parallel to the coastline.

Launching after a parallel make-up requires cradling the SCR 12 and the pipeline 14 into the water. Cradling is the process of using side-boom tractors (not shown) to move the SCR 12 and pipeline 14 in a traveling "S" fashion from onshore until the SCR 12 and the pipeline 14 are fully submerged in the surf (the immediate foreshore area). The leading end 12A of the combination SCR 12 and the pipeline 14 is then deflected in a lateral direction until the entire length of the combination SCR 12 and pipeline 14 is totally submerged prior to the start of the tow.

A plurality of temporary buoyancy units 50 are attached along the length of the SCR 12 by suitable attachment means (not shown), which may be, for example, any of a variety of conventional clamps or latches that are well-known in the art. Preferably, the connection means are provided by self-releasing latches, of a type well-known in the art. The temporary buoyancy units 50 provide a sufficient buoyancy to permit the lead tow vessel 18 to tow the SCR 12 and long sections of combined pipeline 14 using the bottom tow method described below and illustrated in FIG. 1. The leading end 12A of the SCR is attached to the lead tow vessel 18, and the combined SCR/pipeline is towed offshore to a predetermined distance (e.g., about 16 km) from the semi-submersible structure 16, typically at a nominal speed of about 6.5 knots. The predetermined distance is not critical, as long as it is sufficient to permit the crews of the towing vessel 18 and the trailing vessel 20 to become familiar with the handling and control process. Thus, the pre-determined distance may be as little as about 5-6 km, or it may be greater than 16 km, if it is felt to be necessary under a particular set of conditions.

After the towing vessel 18 arrives at the predetermined distance from the semi-submersible structure 16, an ROV 40 is employed to attach the trailing end 14B of the pipeline 14 to a cable 15 wound on a winch (not shown) on the trailing vessel 20. Any suitable connecting device or mechanism known in the art may be used to connect the pipeline trailing end 14B to the cable 15. The cable 15 is sufficiently long to allow the trailing vessel 20 to support the pipeline trailing end 14B on or near the seabed 25. The installation spread 10 is now ready for towing to a final stopping position 24, using the final tow-in configuration illustrated in FIG. 1.

The final tow-in configuration provides for the SCR 12 to be towed in its elevated position to its handover-point at the semi-submersible structure, whereby the leading end 12A of the SCR 12 maintains a pre-selected and controllable "hang-off" angle with respect to the vertical during the final tow-in. The final tow-in is performed at a second, reduced towing speed. The selected angle from vertical for the leading end 12A is determined by the length of pipeline 14 towed on the seabed 25, which, in turn, is controlled by the trailing vessel 20 selectively raising and lowering the trailing end 14B of the pipeline 14 above the seabed 25 (by means of the cable 15) to control the length of the pipeline 14 that is dragged on the seabed 25. The greater the length of pipeline 14 dragged along the seabed 25, the greater is the drag force applied to the pipeline, and the greater the hang-off angle of tow with respect to vertical. Thus, the SCR 12 may be towed to the final stopping position 24 in a nearly vertical orientation (i.e., with a hang-off angle of not more than about 15°) by lifting the trailing end 14A of the pipeline 14 farther from the seabed 25, thereby reducing the length of the pipeline 14 dragged on the seabed 25, while substantially reducing the towing speed. In an exemplary embodiment, where the pipeline 14 is to be installed at a depth of about 2400 meters, the length of the SCR 12 is about 3660 meters, and the length of the pipeline is about 6100 meters, the hang-off angle for the leading end 12A of the SCR 12 can thus be maintained at about 10°-12°, with a reduced towing speed for the installation spread 10 of about 2.0-2.5 knots. In this configuration, the SCR/pipeline is towed until the final stopping position 24 is reached.

FIGS. 2 through 8 illustrate a method for installing the SCR 12 and the associated pipeline 14 of FIG. 1 on a seabed. Shown in FIGS. 2 through 5 is an installation assembly 30, comprising an anchoring structure 32 and an attached connecting cable 36. The anchoring structure 32 is preinstalled at the final stopping position 24, before the bottom towing method is initiated, by a survey team that chooses the final stopping position 24 of the SCR 12 and associated pipeline 14. In an exemplary embodiment, the anchoring structure 32 is a suction pile, of a type well-known in the art, that is well-suited for deepwater applications and other mooring functions.

Figure 3:
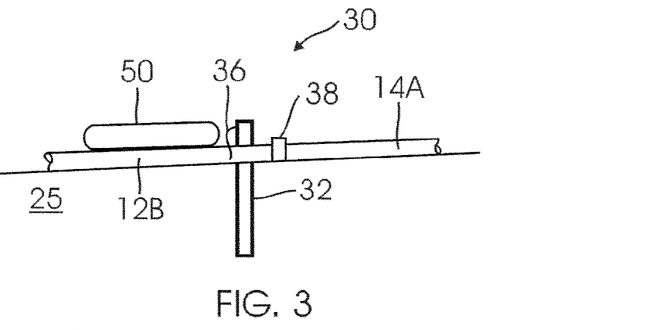

FIG. 3 illustrates a partial view of an SCR trailing end 12B and the associated pipeline leading end 14A. Shown is one of the plurality of temporary buoyancy units 50 attached to the SCR 12, and also shown is a pipeline connecting clamp 38. The pipeline connecting clamp 38 is attached between the leading end 14A of the pipeline 14 and the trailing end 12B of the SCR 12, and along with the connecting cable 36, is used to secure the SCR 12 and the pipeline 14 to the final stopping position 24, as described below.

FIG. 4 illustrates the step of securing the connecting cable 36 to the pipeline connecting clamp 38. An ROV 40, deployed from an ROV cage 42 by means of an umbilical cable 44, is positioned near the pile 32 and the pipeline connecting clamp 38. The ROV 40 provides observation information from the ROV 40 to the ROV handling vessel 22. The ROV handling vessel 22 uses the observation information to maneuver the ROV 40 during the process of securing the connecting cable 36. The ROV 40 may include any number of observation or monitoring systems known to those in the art, such as, for example, and/or a video observation system or an acoustical observation system. In an exemplary embodiment of the invention, the observation system used is an acoustical observation system (not shown). The ROV 40 includes maneuvering arms 45 and 46. The ROV cage 42 is used to house the ROV 40 during the trip between the sea surface and the seafloor 25. The umbilical cable 44 connects the ROV 40 to the ROV handling vessel 22, and it typically houses the control and communication lines or cables used to transmit control and monitoring signals between the ROV 40 and the ROV handling vessel 22. Under the control of the ROV handling vessel 22, the ROV 40 secures the connecting cable 36 to the pipeline connecting clamp 38 by using maneuvering arms 45 and 46.

Figure 5:
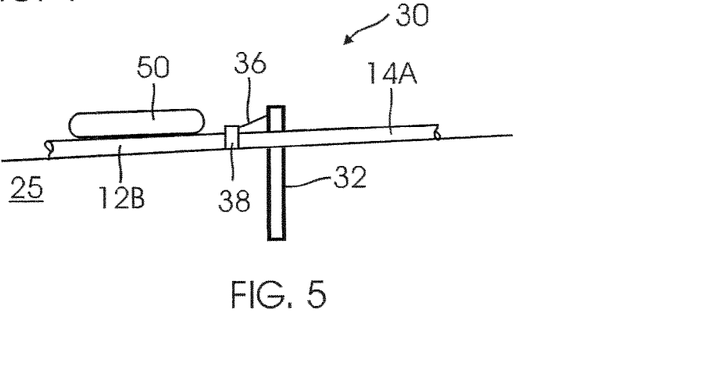

FIG. 5 shows the connecting cable 36 securely connected to the pipeline connecting clamp 38. Further, the trailing end 12B of the SCR 12 and the leading end 14A of the pipeline 14 are shown as having been moved forward relative to the pile 32. The bottom towing method described above and illustrated in FIG. 1 is used to relocate the combined SCR 12 and pipeline 14 from the final stopping point 24 to an SCR touchdown operating position 26 shown in FIG. 1.

Figure 6:
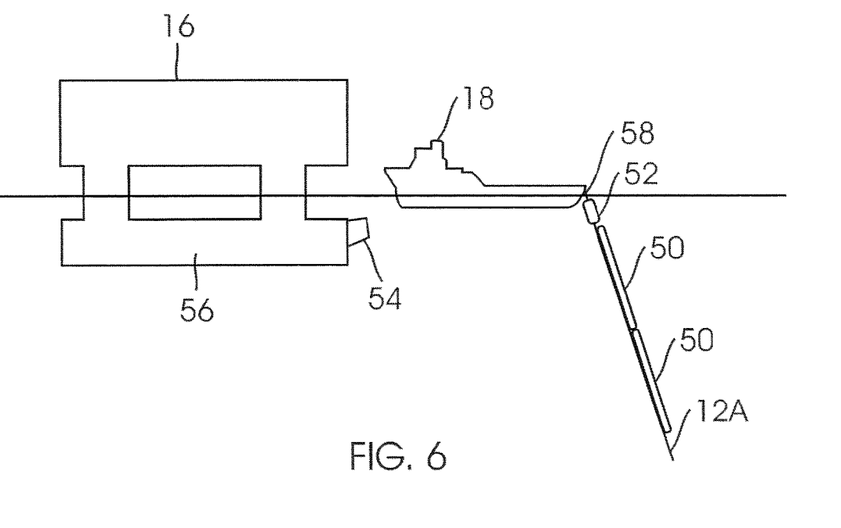
FIGS. 6-8 are simplified, semi-diagrammatic views showing the connection of an SCR and pipeline to a semi-submersible offshore structure using a tow vessel, in accordance with the present invention
Figure 7:
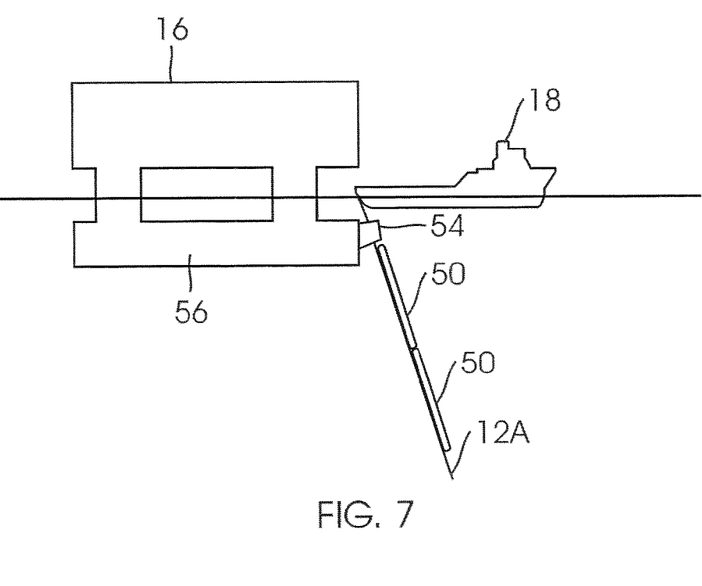
Figure 8:
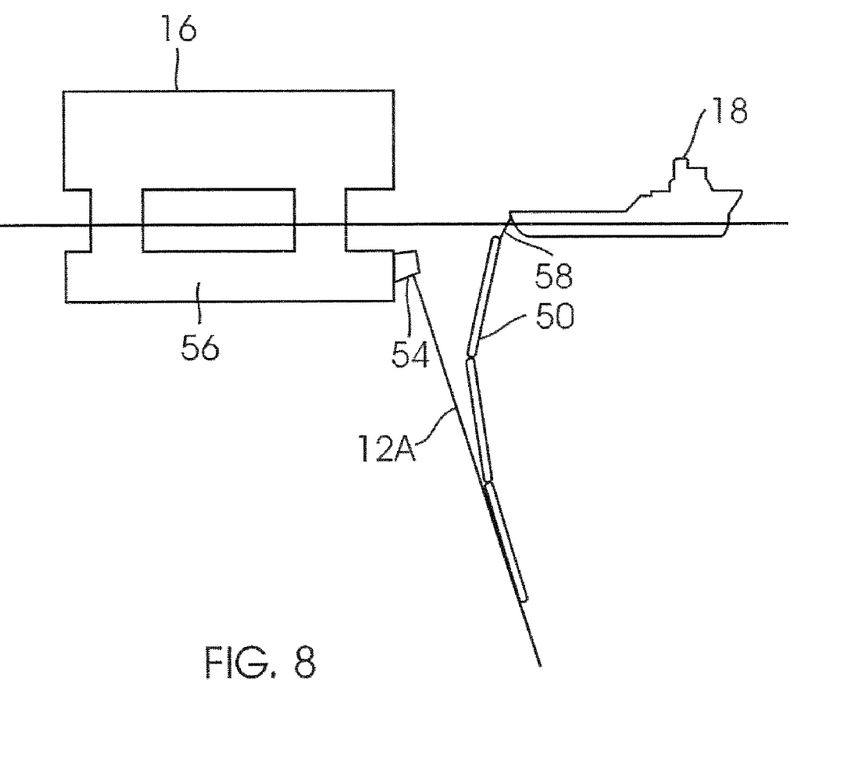

FIGS. 6 through 8 illustrate the process of placing an SCR head 52 in an SCR head receiver 54 that is mounted on the semi-submersible structure 16, typically (but not necessarily) on a pontoon 56 thereof. The SCR head 52 is attached to the uppermost section of the leading end 12A of the SCR 12. Included on the SCR head 52 are connectors (not shown) for attaching the SCR head 52 to a towing cable 58 deployed from the stern of the lead tow vessel 18. In normal operations, the SCR head 52 is configured to mate with the SCR head receiver 54 of the semi-submersible structure 16.

FIG. 6 shows the lead tow vessel 18 approaching the side of the semi-submersible structure 16 on which the SCR head receiver 54 is mounted. FIG. 7 shows the lead tow vessel 18 maneuvered into a position in which its stern is located adjacent the SCR head receiver 54. The lead tow vessel 18 completes the placement of the SCR head 52 by slowing and closing into the semi-submersible structure 16, and lowering the SCR head 52 into the SCR head receiver 54, as is well-known in the art.

FIG. 8 shows the SCR head 52 securely installed into the SCR head receiver 54. Further, shown is the lead tow vessel 18 removing the plurality of temporary buoyancy units 50. After the securing of the SCR head 52 into the SCR head receiver 54, the towing cable 58 is detached from detached from the SCR head 52, and it is then attached by a connector (not shown) to the plurality of temporary buoyancy units 50. The temporary buoyancy units 50 are removed as the lead tow vessel 18 gets under way.

Figure 9:
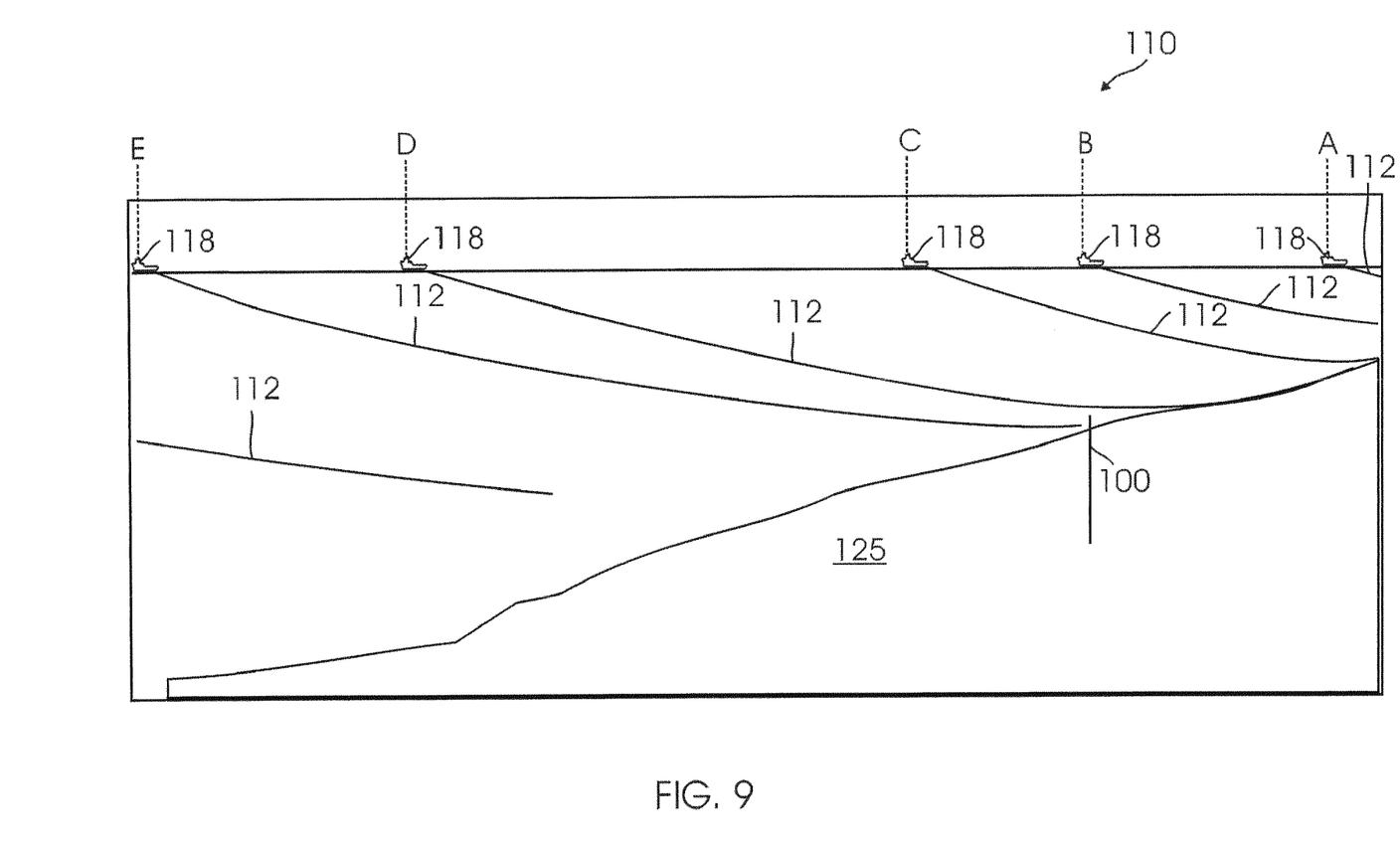
FIG. 9 is a semi-diagrammatic illustration of the submerged flying technique of an SCR and pipeline in accordance with the present invention.
Figure 10:
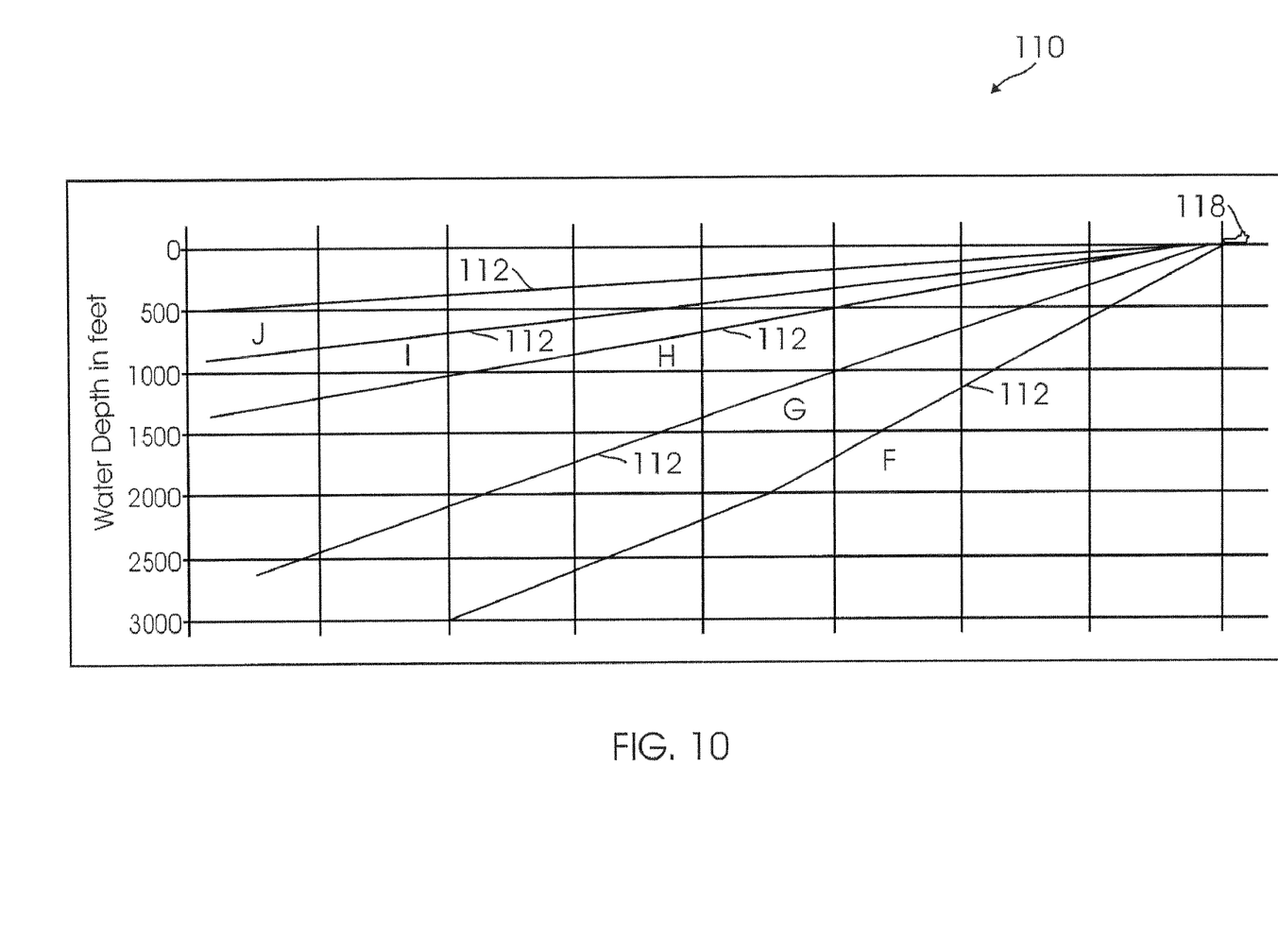
FIG. 10 is a graphical representation showing riser configurations at several depths as a function of speed for the combination bottom tow and submerged flying technique of FIG. 9.

FIGS. 9 and 10 show an alternative embodiment of the present invention, namely, a towing method that is the above-described bottom-towing method combined with submerged "flying" of the pipeline assembly, for use with drilling, production, and catenary risers. The method includes a towing spread 110 comprising a towing vessel 118 and the associated riser 112. The towing spread 110 also typically includes a utility vessel (not shown). The method is started from a make-up site (not shown) on shore, where, prior to starting the towing of the riser 112, the riser is made-up as describe above. After the make-up, the riser 112 may then be tested for operational readiness.

After testing, the riser 112 is launched from the make-up site. Launching comprises supporting the lead end of the riser 112 near the water surface using the towing vessel 118. The towing vessel 118 supports the lead end of the riser 112 with a towing cable (not shown) having a maximum length of about 30 meters. After launching is completed, the towing spread 111 gets under way.

As shown in FIG. 9, position A, the riser 112 is towed by the towing vessel 118 with the riser upper end near the stem of the towing vessel 118 close to the water surface. The towing spread 110 establishes a bottom tow velocity of about 6.5 knots and maintains the bottom tow velocity until the trailing end of the riser 112 lifts off at the edge of the continental shelf 100, where the water depth is typically approximately 200 meters. The bottom tow velocity is maintained by the towing spread 10 while the trailing end of riser 112 still contacts the seabed 125, as shown from position 'A' through position 'D' of FIG. 9. After the trailing end of the riser 112 lifts off at the edge of the continental shelf, the towing spread 110 establishes a higher cruising speed, as shown at position E in FIG. 9. The cruising speed may be, for example, approximately 10 knots. The cruising speed is maintained until the towing spread arrives within a predetermined distance from a final position. If the towing vessel 118 loses power before the riser 112 lifts off from the continental shelf, the utility vessel (not shown) keeps the riser 112 in tension to an acceptable limit of bending stress. If the towing vessel 118 loses power in water deeper than the length of the riser 112, the tow vessel 118 stops, and the riser 112 deploys to a freestanding mode. Upon restart, the riser 112 resumes its tow configuration.

In an exemplary embodiment, the riser 112 has a length of about 3660 meters and has a submerged mass of approximately 60 kg/m. With these dimensions, the riser 112 will typically lift off the continental shelf at approximately 130 to 200 km from shore using a bottom tow speed of 6.5 knots.

FIG. 10 is a graphical representation of riser configurations at several water depths as a function of the towing speed of the towing spread 110 of FIG. 9. Shown is the towing spread 110 being towed at a range of speeds from marked "F" through "J", representing speeds of 1, 2, 4, 6 and 11 knots, respectively. The greater the towing speed of the tow spread 110, the closer the trailing end of the riser 112 travels to the water surface. For example, at the cruising velocity "F" (1 knot), the depth of the trailing end of the riser 112 falls below approximately 3000 feet (approximately 900 meters) in water depth. At the greatest speed "J" (a cruising speed of 11 knots), the trailing end of the riser 112 is approximately at 500 feet (approximately 150 meters) in water depth.

Figure 11:
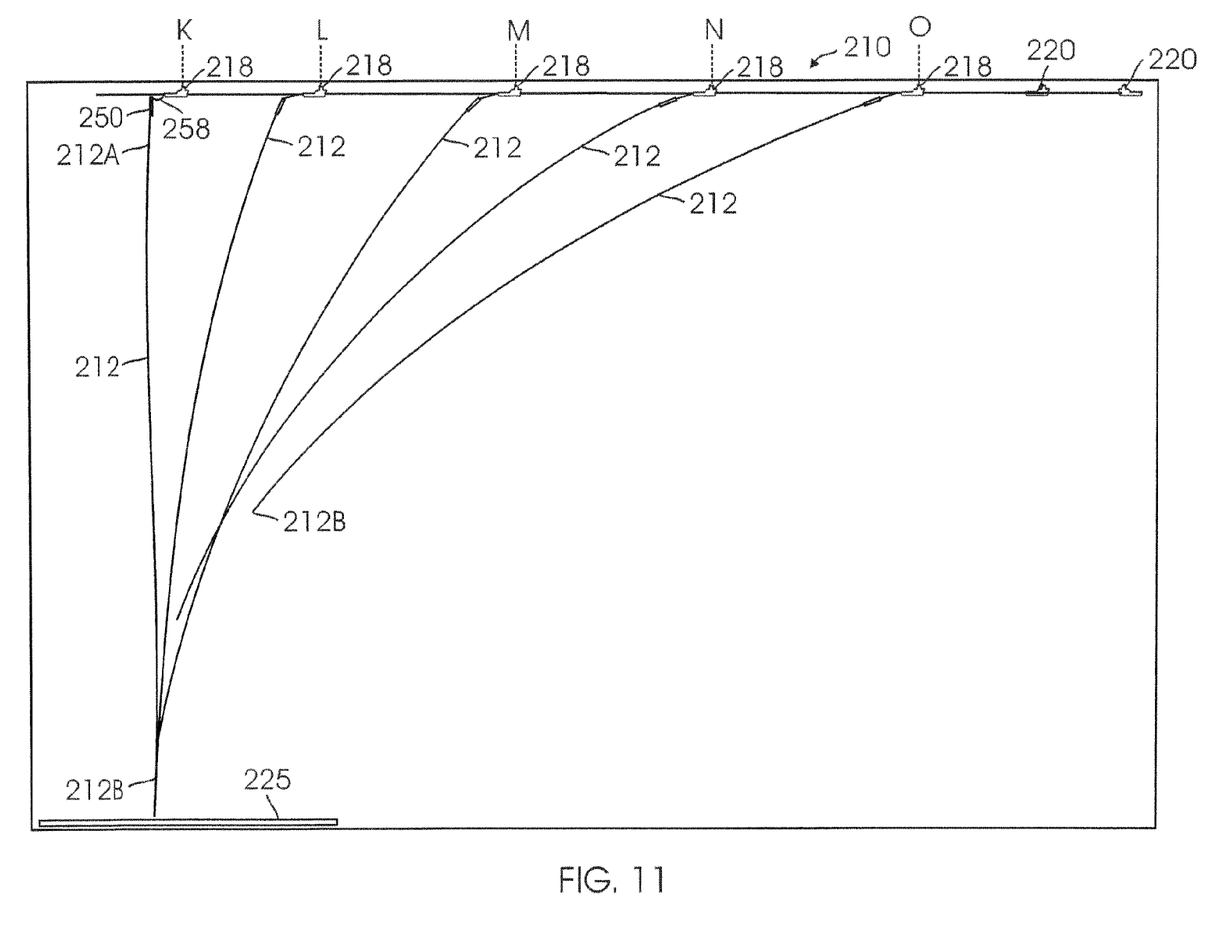
FIG. 11 is a semi-diagrammatic illustration of a removal procedure and a submerged flying technique for a free standing riser.
Figure 12:
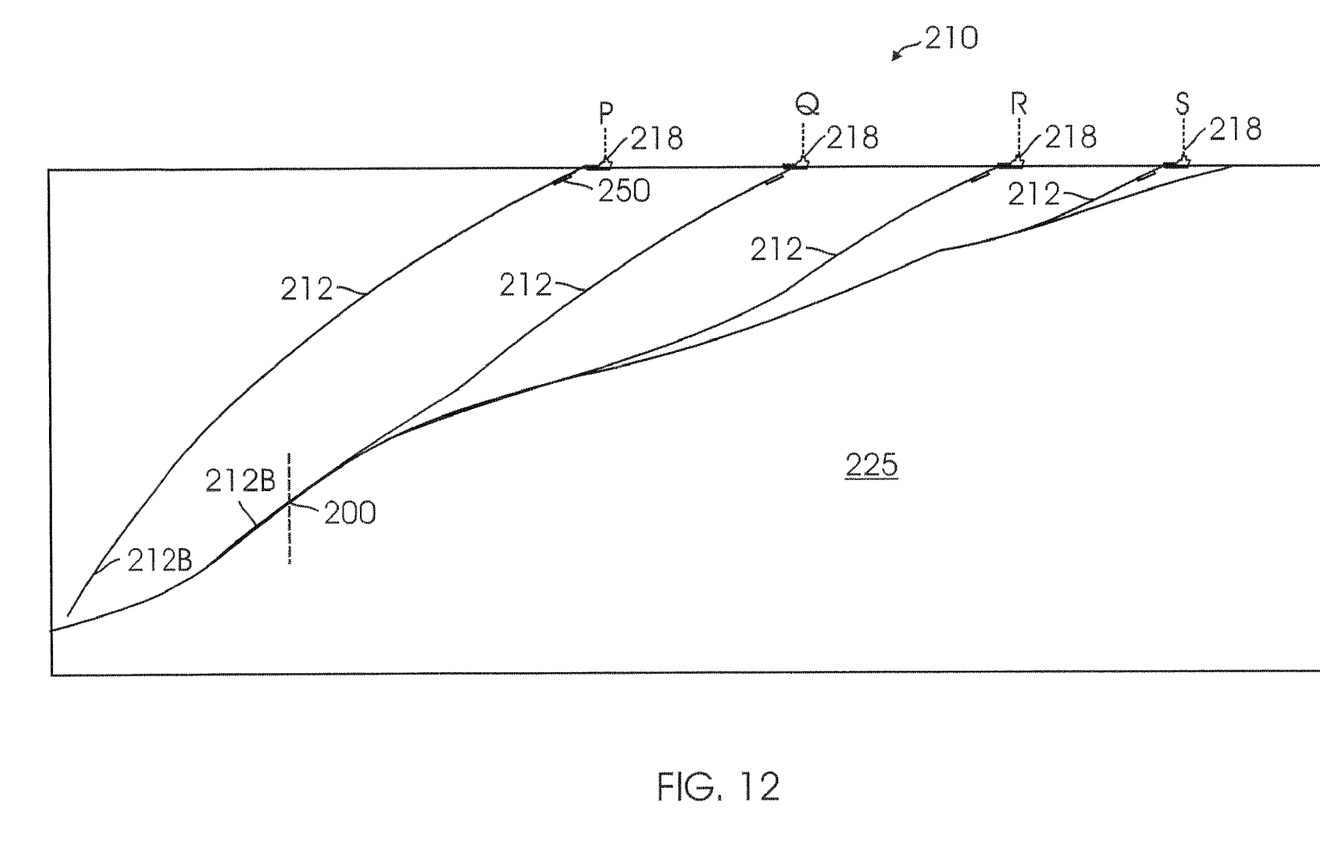
FIG. 12 is a semi-diagrammatic illustration showing a transition from the submerged flying technique to the landing of the riser in the shallow water as it approaches shore.

FIGS. 11 and 12 show yet another embodiment of the present invention, namely, a method for removing and returning to shore a free standing, drilling, production or catenary riser using a combination of a submerged flying procedure and a bottom-towing procedure. The method uses a towing spread 210 comprising a towing vessel 218 and a riser 212. The towing spread 210 may include additional vessels 220 to assist the towing vessel 218 as required. The riser 212 includes a leading end 212A, a trailing end 212B, and (optionally) a buoyancy system 250. The trailing end 212B of the riser 212 is connected to equipment (not shown) located on the seafloor 225. Such equipment is known in the art and may include a blowout preventer (BOP) (not shown).

The method begins at position "K" (FIG. 11), where the riser trailing end 212B is disconnected from the BOP (not shown). The towing configuration is established as a function of the amount of buoyancy, the degree of riser trim, the towing speed and sea state conditions. The riser 212 is pressurized to evacuate any water contained within it. Then the towing vessel 218 connects a towing cable 258 to a tow head (not shown) at the top (leading end 212A) of the riser 212. The towing spread 210 gets under way as shown at position "L" through position "M," and the riser trailing end 212B rises off the seabed 225. The towing spread 210 establishes and maintains the towing configuration for the trip at sea, shown at positions "N" through "O." The towing speed at this point may be established as a cruising speed of about 10-12 knots.

Referring now to FIG. 12, the towing spread 210 continues under way as shown at position "P." Prior to touchdown, as shown at position "Q," the towing spread 210 reduces speed similar to an airplane approaching a runway. Touchdown occurs when the trailing end 212B of the riser 212 contacts the seabed 225 at a touchdown point 200 where the water depth is approximately 200 meters. Following touchdown by the trailing end 212B, the towing vessel 218 reduces the towing speed to about 6.5 knots for the bottom towing operation. During the bottom towing and prior to the towing spread 210 arriving on shore, a cable (not shown) is deployed from shore and connected to the leading end 212A of the riser 212 for winching the riser 212 onto shore. The riser 212 may be inspected, refurbished or modified once the riser 212 is on shore.

Although the present invention has been described herein in the context of several exemplary embodiments, it will be understood that a number of variations and modifications may suggest themselves to those skilled in the pertinent arts. Such variations and modifications should be considered within the spirit and scope of the present invention, as defined in the claims that follow.

I claim:

1. A method of towing of an SCR and a pipeline along a seabed, the SCR including a leading end and the pipeline including a trailing end, the method comprising the steps of:
    connecting the leading end to a towing vessel;
    towing the SCR and the pipeline with the towing vessel to a first predetermined site at a first towing speed;
    upon arrival at the first predetermined site, attaching the trailing end to a cable winched from a trailing vessel so that the trailing end is supported on or near the seabed;
    resuming the towing of the SCR and pipeline to a second predetermined site at a second towing speed that is less than the first towing speed while the trailing end is supported from the trailing vessel by means of the cable; and
    while the SCR and pipeline are being towed to the second predetermined site, controlling a hang-off angle of the leading end during towing by selectively raising and lowering the trailing end of the pipeline to control the amount of drag applied by the seabed to the pipeline.

2. The method of claim 1, wherein the hang-off angle is controlled so as to be maintained between about 10° and 15° from the vertical.

3. The method of claim 1, wherein the step of attaching the trailing end to the cable is performed by an ROV.

4. The method of claim 1, wherein the second site is a semi-submersible offshore structure, and wherein the first site is a pre-determined distance from the structure.

5. The method of claim 4, wherein the pre-determined distance is at least about 5 km.

6. The method of claim 1, wherein the step of connecting the leading end to the towing vessel includes the step of attaching a plurality of temporary buoyancy devices along the length of the SCR, and wherein the buoyancy devices are removed from the SCR after arrival at the second site.

7. A method for recovering a riser having a trailing end connected to a seabed, the riser having a leading end and a buoyancy system attached between the leading end and the trailing end, the method comprising the steps of:
    connecting a towing vessel to the leading end of the riser;
    disconnecting the trailing end from the seabed;
    towing the riser toward shore with a first towing speed until the trailing end touches down on the seabed;
    after the trailing end touches down, towing riser toward shore at a second towing speed that is less than the first towing speed;
    connecting an on-shore cable to the riser prior to the riser arriving on shore; and
    recovering the riser from the water onto shore using the cable.

* * * * *

UNITED STATES PATENT AND TRADEMARK OFFICE
CERTIFICATE OF CORRECTION

PATENT NO.         : 7,559,721 B2
APPLICATION NO.    : 11/380399
DATED              : July 14, 2009
INVENTOR(S)        : Robert J. Brown It is certified that error appears in the above-identified patent and that said Letters Patent is hereby corrected as shown below:

In column 3, line 13, delete "11" and insert -- 10 --, therefor.

In column 6, line 53, delete "111" and insert -- 110 --, therefor.

In column 6, line 55, delete "stem" and insert -- stern --, therefor.

In column 6, line 62, delete "10" and insert -- 110 --, therefor.

Signed and Sealed this

Twenty-ninth Day of December, 2009

David J. Kappos
*Director of the United States Patent and Trademark Office*